United States Patent [19]

Moraw et al.

[11] Patent Number: 4,560,426
[45] Date of Patent: Dec. 24, 1985

[54] PROCESS FOR THE MANUFACTURE OF IDENTITY CARDS

[75] Inventors: Roland Moraw, Wiesbaden; Manfred Unger, Schlangenbad; Helmut Walter, Wiesbaden, all of Fed. Rep. of Germany

[73] Assignee: Hoechst Aktiengesellschaft, Frankfurt am Main, Fed. Rep. of Germany

[21] Appl. No.: 101,183

[22] Filed: Dec. 7, 1979

[30] Foreign Application Priority Data

Dec. 14, 1978 [DE] Fed. Rep. of Germany ....... 2853893

[51] Int. Cl.⁴ ............................................. B32B 31/04
[52] U.S. Cl. ....................................... 156/64; 40/625; 40/626; 40/629; 156/234; 156/235; 156/250; 156/277; 283/75; 428/195; 428/203; 428/916
[58] Field of Search ...................... 40/1.5, 1.6, 2 R, 2.2, 40/625, 626, 629; 156/64, 234, 235, 238, 240, 277, 250; 229/92.3; 283/6, 7, 8 B, 8 R, 9 R, 18; 428/203, 915, 916, 195; 430/2, 10; 355/3 SH, 3 TR, 4, 7, 132, 133

[56] References Cited

U.S. PATENT DOCUMENTS

| | | | |
|---|---|---|---|
| 3,152,901 | 10/1964 | Johnson . | |
| 3,402,488 | 9/1968 | Leavitt | 40/2.2 |
| 3,417,497 | 12/1968 | Hannon | 40/2.2 |
| 3,461,581 | 8/1969 | Hoffmann | 40/2.2 |
| 3,994,225 | 11/1976 | Sitzberger | 430/10 X |
| 4,006,050 | 2/1977 | Hurst et al. | 156/234 |
| 4,014,602 | 3/1977 | Ruell | 283/7 X |

FOREIGN PATENT DOCUMENTS

| | | |
|---|---|---|
| 2012722 | 10/1971 | Fed. Rep. of Germany . |
| 2262507 | 6/1973 | Fed. Rep. of Germany . |
| 2545799 | 4/1977 | Fed. Rep. of Germany . |
| 2139347 | 1/1973 | France . |
| 2161663 | 7/1973 | France . |
| 2305806 | 10/1976 | France . |
| 2331455 | 6/1977 | France . |
| 2336745 | 7/1977 | France . |
| 81049 | 6/1979 | Luxembourg . |

Primary Examiner—Robert A. Dawson
Attorney, Agent, or Firm—Schwartz, Jeffery, Schwaab, Mack, Blumenthal & Evans

[57] ABSTRACT

Disclosed is a method of manufacturing multilayer identity cards by electrophotographically reproducing identity information on a card core material and then laminating protective film on both sides of the core material. In preferred embodiments, the core material itself may be made up of several layers with additional security markings thereon. A relief grid image or a hologram can be inserted into the card core prior to lamination. In a further embodiment, after lamination, the identity card blank is photomechanically scanned and positioned in accordance with existing control marks and punched to produce the finished identity card.

11 Claims, 3 Drawing Figures

PROCESS FOR THE MANUFACTURE OF IDENTITY CARDS

BACKGROUND OF THE INVENTION

The present invention relates to a process for the manufacture of identity cards which are comprised of several layers.

Cards of this type are used as information carriers or data carriers for personal passports, passports, cheque cards, credit cards, identity cards and similar certificates of identity which must be rendered secure against complete forgeries by counterfeit cards and against falsifications by partial alteration of the personal data.

Previously proposed identity cards have been produced as fused laminates in which a card core carrying the identity information is protected by transparent films which are of a different nature than the card core. Thus, West German Offenlegungsschrift No. 2,308,876 describes an identity card consisting of a relatively thick carrier film and a thin transparent film, between which there is a special paper having internal features, such as watermarks, banknote printings or the like. These features serve as protection against forgeries and cause differences in the thickness of the paper. The three layers are plastified together in such a way that the internal features are manually, mechanically and/or visually detectable through the transparent film. Further markings which serve to identify the cardholder are provided at a suitable location of this known identity card. For example, a photograph in the form of a film transparency may be inserted during plastifying between the special paper and the carrier film and firmly bonded to the special paper. Furthermore, it is possible, at any desired point on the front or rear of the identity card, to laminate a strip of special paper, in accordance with known security technology, onto the outside of the plastic material as a field for later insertion of signatures or other handwritten entries.

West German Auslegeschrift No. 2,163,943 discloses a personal identity card which comprises a combination of a support layer, an electrically conductive layer, a barrier layer, a photoconductive layer with an organic photoconductor, an optional cover layer, a protective layer on the photoconductive layer or on the cover layer, a protective layer on the rear of the layer support and an optional cover layer on the last-mentioned protective layer. In this type of personal identity card, a number of different materials are assembled to give a laminate which, due to the lack of homogeneity of the individual layers, can be split apart so that it is possible to carry out forgeries.

This type of identity card is manufactured in such a way that the required data are printed on the inside of a transparent non-plastic polyvinyl chloride film by means of an offset printing machine. Then a printing ink layer having a high hiding power is printed on top, so that only the areas provided for the signature and the photograph of the cardholder are left uncovered. The photoconductive layer with an organic photoconductor is charged in a dark room to a voltage of −6 kV by means of a spray discharge. It is then inserted into a camera wherein an objective lens and a lighting arrangement are combined to photograph the cardholder. A further objective lens for photographing signs with the aid of the lighting arrangement may be included. After the image-forming exposure, a liquid developer is used to develop the electrostatic images which are then dried and bonded, without a fixing operation, to the photoconductive layer of the previously prepared surface-protecting layer, consisting of the polyvinyl chloride film, by means of a hot press. The rear is then provided with a transparent non-plastic polyvinyl chloride film which may carry any required data on its inside. The entire surface is printed with an additional white cover layer which covers an aluminum foil serving as a conductive layer. It is also possible to print the white cover layer directly upon the rear of the photoconductive layer with the organic photoconductor or to use a milky white sheet as a base for the light-sensitive element.

In the manufacture of this personal identity card, the recording carrier for the photograph of the cardholder will, at the same time, serve as an image carrier for the electrostatic charge image, i.e. an image transfer does not take place. As the card core, the recording carrier is laminated with polyvinyl chloride films which may contain any required data on their insides. It is obvious that this known manufacturing process precludes a production line of identity cards, in the manner of a conveyor-line production, for producing a high volume card output. Here, for each individual card, the respective cardholder must be photographed on the spot, which is a time-consuming procedure.

SUMMARY OF THE INVENTION

It is, therefore, an object of the present invention to provide a process for the manufacture of identity cards, which results in a high production capacity, ranging between 1000 and 3000 cards per hour in a conveyor-line operation. It is a further object of the present invention to provide a process for the mass production of identity cards, which are, to a large extent, secure against imitations and forgeries.

In accordance with the present invention, the above and other objects are achieved in the manufacturing process in which identity information, such as one or more photographs and a data block, is electrophotographically reproduced on a card core material. The card cores are then laminated with transparent protective films on each side. In a preferred embodiment, the reproduction step includes the steps of electrophotographically reproducing the identity information as an image on a recording carrier, developing the image on the recording carrier and transferring the identity information image from the recording carrier to the card core material prior to lamination. Additionally, the identity card blanks can be photomechanically scanned after lamination and adjusted according to existing control marks prior to being punched to the final dimensions of the identity cards. Additionally, prior to the final lamination step, relief grid images or holographic film can be inserted into the card core for providing additional security against imitation and forgery.

BRIEF DESCRIPTION OF THE DRAWINGS

A more complete appreciation of the invention and the attendant advantages thereof will be more clearly understood by reference to the following drawings, wherein.

DETAILED DESCRIPTION OF A PREFERRED EMBODIMENT

The present invention offers the advantage of a central manufacture of identity cards, which facilitates control of the materials and techniques required for the certificates of identity. Frequent reissuing of identity cards of this kind, at intervals of one or several years, for example, as practised by banks in the case of cheque cards, if appropriate, with new security markings on the materials used, will render it more difficult to devise falsification techniques. Furthermore, the invention has the advantage that the card core, containing the complete data of the data block provided and one or two passport photographs, is applied in a single process step with the aid of the electrophotographic copying technique, corresponding to the electrophotographic office copying technique which has been successfully employed for a long time. This single and, at the same time, fast recording technique favors the central manufacture of the identity cards and a frequent reissuing thereof.

Figure 1:
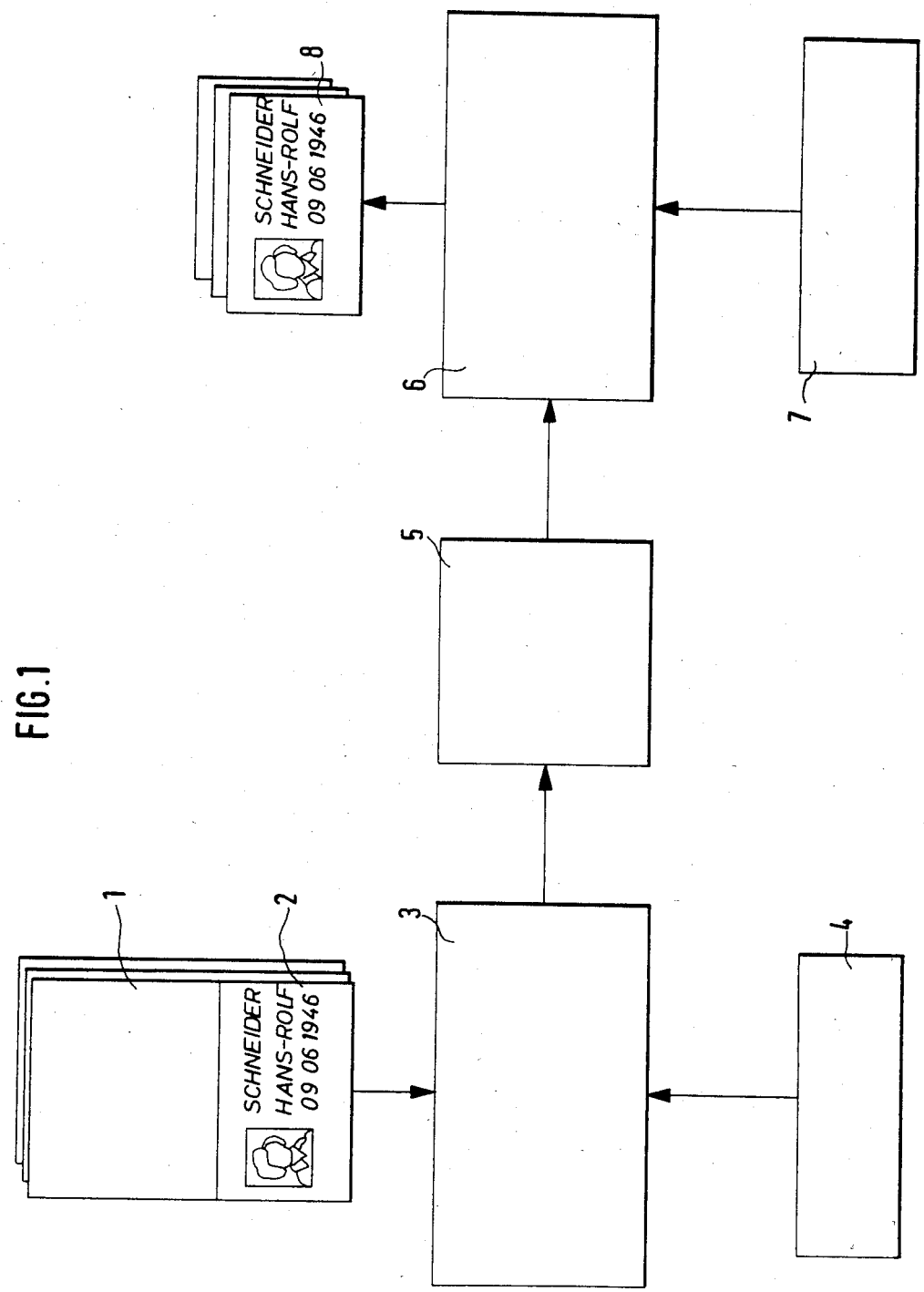
FIG. 1 is a block diagram representation of the individual stations in the process for the manufacture of an identity card which is provided with security prints and at least one photograph.

Referring now to the drawings wherein like reference characters designate like parts throughout the several views, FIG. 1 shows a block diagram of the procedure followed in the manufacture of identity cards in accordance with the present invention. The process is based on application forms 1 which, in their upper part, contain the personal data, for example, first name, last name, date of birth, profession, academic degree, address etc., of the future cardholder. In the lower part of the form, this identity information is typewritten, in the form of a data block, on an original card 2. The original card 2 carries further a photograph of the cardholder and his signature. The individual application form 1 is placed at the entry of an electrophotographic copying machine 3 and is fully automatically transported upon the object stage of the copying machine 3 for electrophotographic copying. Since electrophotographic copying machines are widely known, the operation of a machine of this type is not described in this connection.

Card core material films comprising a polymer material, for example, polymers based on polyvinyl chloride, are fully automatically removed from card core material magazine 4 and are fed into the electrophotographic copying machine 3. The latent charge images which are reproduced on the recording carrier of the copying machine 3 are developed with a toner into black-and-white or colored powder images and are transferred to the card core material, which forms the image carrier. The fixing temperature for the toner images is kept below the softening temperature of the card core material. The card core material carrying the toner images is subsequently transported into an intermediate magazine 5 and further into a laminating press 6 which is combined with a punch. From a magazine 7, the laminating press 6 is supplied with transparent protective films, for example, comprised of polymers based on polyvinyl chloride. In the laminating press 6 a protective film each is laminated to the front and back sides of each card core. After laminating, the identity card blanks thus obtained are photomechanically scanned and adjusted according to existing control marks and then punched by the punch into the final identity cards 8 which are issued as such. Before the card core material is placed into the magazine 4 it may be printed with security markings, for example, guilloche figures. In the same way, the protective films for the front and back of the identity card 8 may be printed with unicolored or multicolored security markings. As opposed to the described generally smooth card core material, a roughened material may be preferably employed, which results in slightly screened images of a somewhat coarser resolution than in the case of the smooth material, but which has the advantage of an absolutely safe transport of the image carrier through the copying machine 3.

Figure 2:
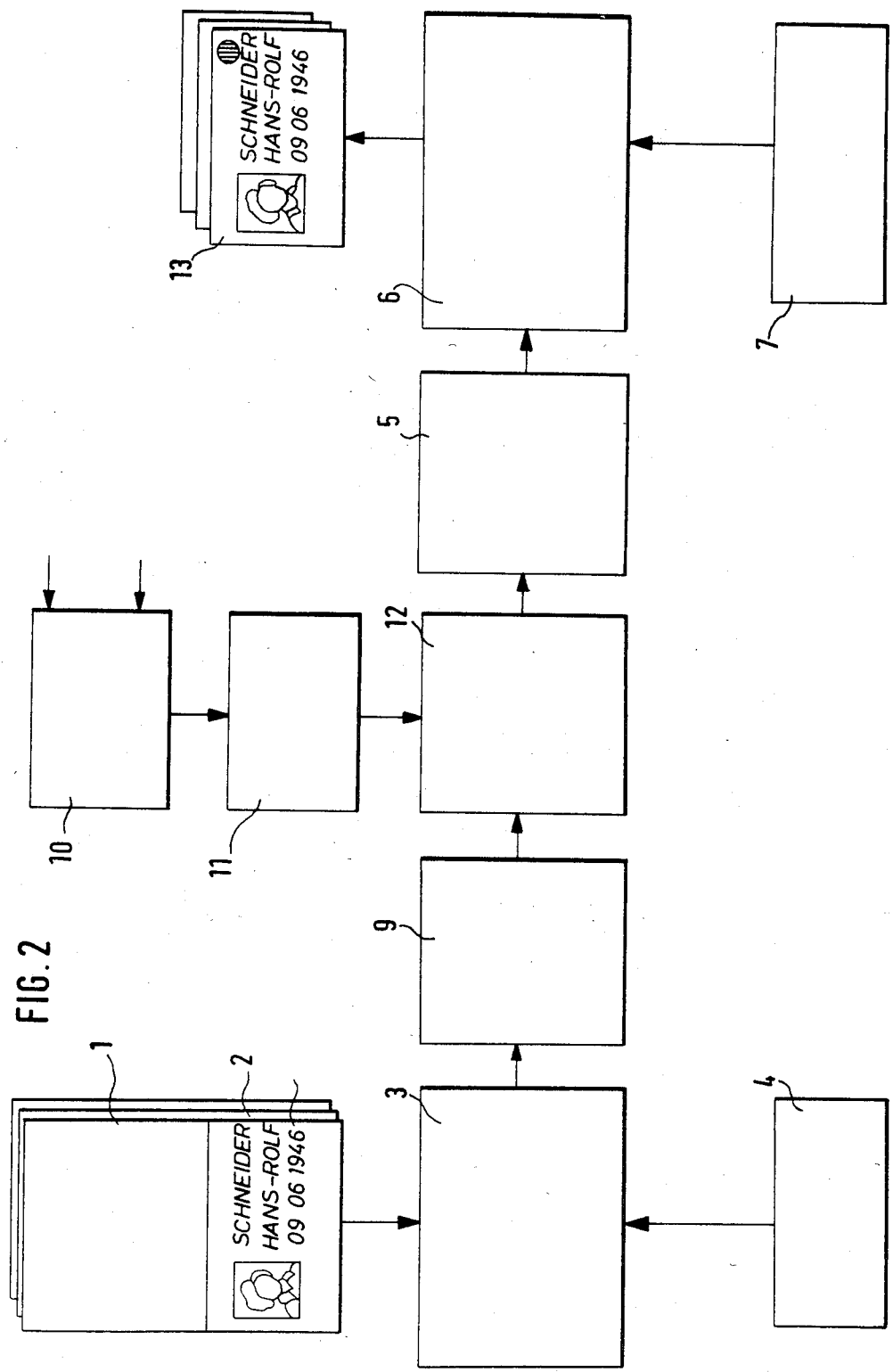
FIG. 2 is a block diagram representation similar to FIG. 1, for the manufacture of an identity card which contains a relief grid structure in the card core.
Figure 3:
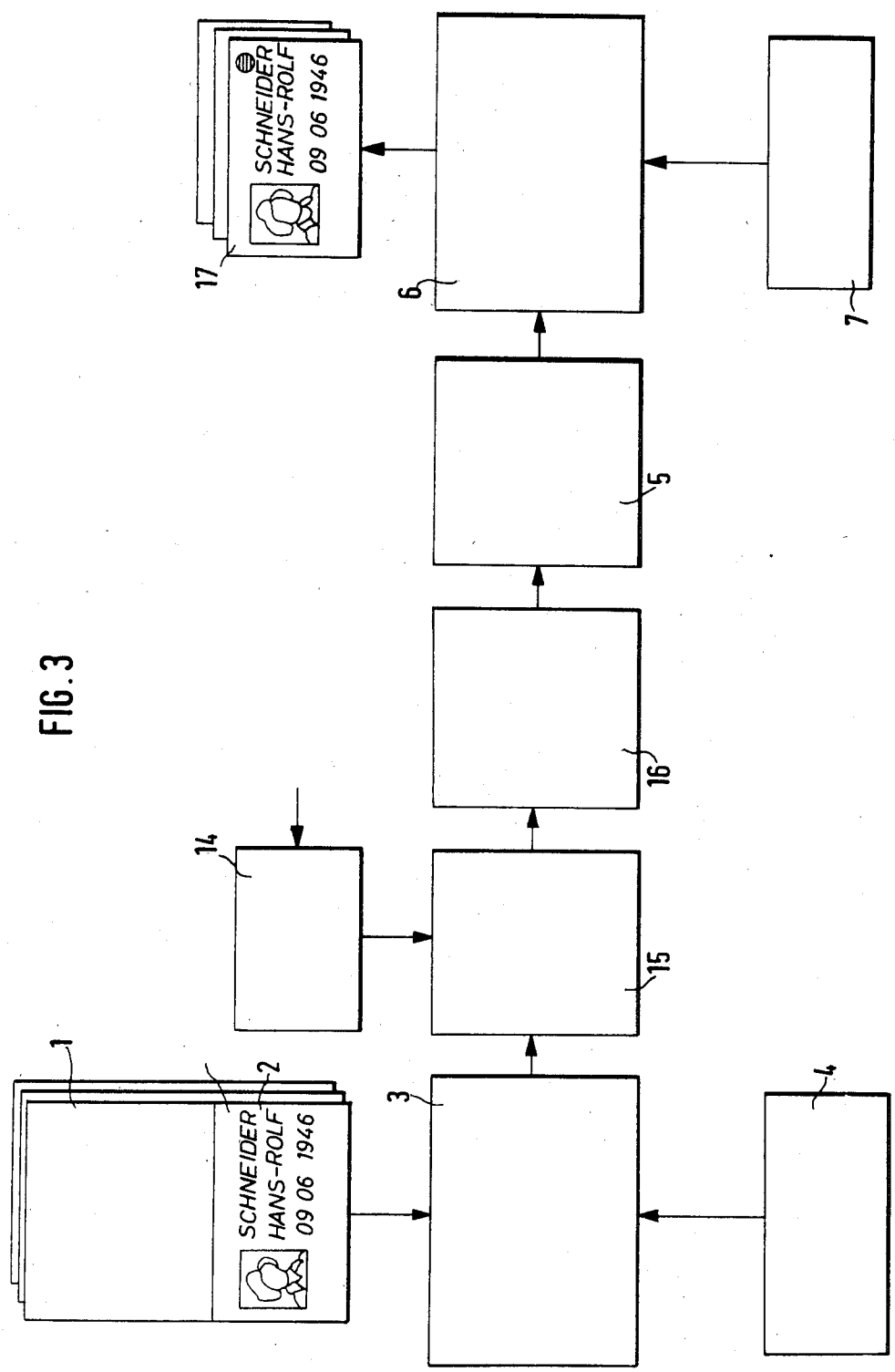
FIG. 3 is a block diagram representation similar to FIG. 1, for the manufacture of an identity card including a hologram of the card core.

By reference to FIGS. 2 and 3, the procedures followed in the manufacture of identity cards which include relief grid images or holograms are explained. The blocks corresponding to those of FIG. 1 are marked with the same reference numerals and their operation would be consistent with the FIG. 1 blocks.

Up to the point of leaving the electrophotographic copying machine 3, the manufacture of identity card blanks comprising relief grid images according to FIG. 2 corresponds to the steps performed in the arrangement of FIG. 1. After that, each identity card blank is passed on to a punching machine 9 and is provided with an aperture at a suitable point, for insertion of a relief grid image. It is then transported to an inserting device 12, wherein the relief grid image, for example, a national emblem, such as a heraldic animal, or an official seal, or the like, is fitted into the punched aperture. The advantage of such an insert is that by transmitted light, the relief grid image can later be in color. It is extremely difficult to counterfeit these grid images, because they comprise arrangements of several hundred linear relief structures per millimeter and the color of the image, upon reproduction, is determined by the respective relief depth. A photographic or typographic imitation is impossible, since the color effects are not produced by particular dyestuffs, but are due to diffraction and interference effects.

The grid images are prepared in an embossing station 10 which is equipped with an embossing die representing, for example, an official seal or a heraldic animal and/or a serial number, and into which a transparent embossing film based on polyvinyl chloride is placed. The web-shaped film is continuously printed with relief grid images by means of the embossing die. After leaving the embossing station 10, the printed film is passed on to a disc punch 11 for punching out the relief grid images which are then transported to the inserting device 12 and fitted into the apertures provided at a suitable point in the identity card blanks.

The identity card blanks are then conveyed to the laminating press 6, via the intermediate magazine 5. In the laminating press 6, appropriate measures should be taken to prevent any damage to the relief grid image during the laminating operation. When the blanks have been laminated in the laminating press with the protective films supplied from the magazine 7, they are punched to their final size and are issued as identity cards 13 having inserted relief grid images.

The manufacture of the identity card blanks according to FIG. 3 proceeds as shown in FIGS. 1 and 2, until the blanks are discharged from the electrophotographic copying machine 3. In a punching machine 15 combined with a film inserting device each blank is punched with an aperture at a suitable point, and a piece of holographic film is inserted into the aperture. This piece of film is supplied from a film punching device 14 which punches pieces of an appropriate size out of a holographic recording film. As a suitable material for the holographic film a photoconductive thermoplastic film is preferably used. The identity card blanks containing the holographic film are then introduced into a holographic camera 16, wherein the data block and the photograph of each blank are holographically reproduced on the piece of holographic film fitted into the aperture, by appropriately folding and deflecting the beam path of a laser. The hologram obtained in this way is then immediately thermally developed in the camera and fixed by cooling.

Following recording of the holograms in the holographic camera 16, the identity card blanks are conveyed to the intermediate magazine 5 and subsequently into the laminating press 6 which is linked with the punch. As in the case of the manufacture of identity card blanks comprising relief grid images, appropriate measures should be taken during the laminating operation to keep the inserted holograms from being damaged. After laminating the card blanks with the protective films supplied from the magazine 7, the blanks are punched to their final size and issued as identity cards 17 having fitted holograms.

Appropriately, the layer material used for the card cores may also be built up of several layers. If so, several layers are provided with security markings. It is also possible to reproduce the photograph of the cardholder, of a particular object or of other indicia on at least two layers of the card core; these reproductions are then arranged in such a manner that they are staggered with respect to one another when the layers are joined into the final card core. Here, the front reproduction of the photograph would appear in reflected light when the identity card is viewed, whereas the reproduction of the rear photograph would be discernible by transmitted light only.

Although the invention has been described relative to a specific embodiment thereof, it is not so limited and many modifications and variations thereof will be readily apparent to those skilled in the art in light of the above teachings. It is, therefore, to be understood that, within the scope of the appended claims, the invention may be practiced otherwise than as specifically described.

The embodiments of the invention in which an exclusive property or privilege is claimed are defined as follows:

1. A process for the manufacture of multilayer identify cards, said process comprising the steps of:
   providing a core material magazine;
   providing a card core material in said magazine;
   automatically removing said card core material from the magazine;
   feeding said core material into an electrophotographic copying device;
   directly transferring identity information from a recording carrier in said copying machine to said card core material forming an image carrier;
   transporting said card core materials to an intermediate magazine and serially storing them therein;
   subsequent to said transporting step, moving said card core materials into a laminating press;
   supplying said laminating press with transparent protective films;
   inserting a relief grid image into the card core as a security marking, said relief grid image having a linear grid structure, the grid depth thereof determining a given image color upon reproduction; and
   laminating said protective films on each side of said card core material forming identity card blanks.

2. A process for the manufacture of a plurality of multilayer identity cards, said process comprising:
   providing originals, each with identity information comprising at least one photograph and a data block;
   electrophotographically reproducing each of said identity informations on a recording carrier;
   developing and transferring each of said identity information to a card core material;
   serially storing said card core materials in an intermediate magazine;
   inserting a relief grid image into the card core as a security marking, said relief grid image having a linear grid structure, the grid depth thereof determining a given image color upon reproduction; and
   laminating transparent protective films on each side of said card core materials forming identity card blanks.

3. A process according to claim 1, wherein said identity information comprises at least one photograph and a data block and said transferring step comprises the steps of:
   providing an original with said identity information;
   electrophotographically reproducing said identity information as an image on a recording carrier;
   developing said image on said recording carrier; and
   transferring said identity information image from said recording carrier to said card core material.

4. A process according to claim 1 or 2, further comprising the steps of:
   photomechanically scanning said card blanks after said laminating step;
   adjusting the position of said card blanks according to existing control marks; and
   punching said card blanks to form the final identity cards.

5. A process according to claim 1 or 2, wherein said card core material comprises film material having a matt coloring, which film material is dyed white by the addition of pigments.

6. A process according to claim 5, wherein said film material and said transparent protective films are comprised of a fusible polymer based on polyvinyl chloride.

7. A process according to claim 6, further comprising the step of providing, prior to said reproducing step, security markings on said card core material.

8. A process according to claim 6, wherein said image on said recording carrier is a white/gray/black toner image.

9. A process according to claim 6, wherein said image on said recording carrier is a colored toner image.

10. A process according to claim 1 or 2, wherein said card core material comprises a roughened film.

11. A process according to claim 1 or 2, wherein said card core material comprises several layers, at least one of said layers including security markings, and each of at least two layers include a photograph reproduced thereon, said photographs being in a staggered arrangement with respect to one another.

* * * * *